TELEPHONE REPERTORY DIALER

Filed March 28, 1966 7 Sheets-Sheet 1

INVENTORS J. L. FISCHER
L. A. STROMMEN
BY [signature]
ATTORNEY

Nov. 18, 1969 J. L. FISCHER ET AL 3,479,469

TELEPHONE REPERTORY DIALER

Filed March 28, 1966 7 Sheets-Sheet 2

TELEPHONE REPERTORY DIALER

Filed March 28, 1966

Nov. 18, 1969 J. L. FISCHER ET AL 3,479,469

TELEPHONE REPERTORY DIALER

Filed March 28, 1966 7 Sheets-Sheet 4

| | TOUCH-TONE OSC. FREQUENCIES | CHANNEL CODE W | X | Y | Z |
|---|---|---|---|---|---|
| 1 | $L_1$ $H_1$ | 1 | 0 | 1 | 0 |
| 2 | $L_1$ $H_2$ | 1 | 0 | 0 | 1 |
| 3 | $L_1$ $H_3$ | 1 | 0 | 1 | 1 |
| 4 | $L_2$ $H_1$ | 0 | 1 | 1 | 0 |
| 5 | $L_2$ $H_2$ | 0 | 1 | 0 | 1 |
| 6 | $L_2$ $H_3$ | 0 | 1 | 1 | 1 |
| 7 | $L_3$ $H_1$ | 1 | 1 | 1 | 0 |
| 8 | $L_3$ $H_2$ | 1 | 1 | 0 | 1 |
| 9 | $L_3$ $H_3$ | 1 | 1 | 1 | 1 |
| 0 | $H_2$ | 0 | 0 | 0 | 1 |

| | | |
|---|---|---|
| FIG. 2A | FIG. 2B | FIG. 2C |

TELEPHONE REPERTORY DIALER

Filed March 28, 1966

United States Patent Office 3,479,469

Patented Nov. 18, 1969

3,479,469
TELEPHONE REPERTORY DIALER

James L. Fischer, Carmel, and Lawrence A. Strommen, Indianapolis, Ind., assignors to Bell Telephone Laboratories, Incorporated, New York, N.Y., a corporation of New York Filed Mar. 28, 1966, Ser. No. 537,897
Int. Cl. H04m *1/26*
U.S. Cl. 179—90 2 Claims

ABSTRACT OF THE DISCLOSURE

In a telephone repertory dialer a magnetic storage medium is driven in incremental steps during both the record and reproduce modes by a continuously operating motor coupled to the medium by a slip-clutch and spring arrangement. Mechanical wear and shock are reduced by selecting motor speed, storage medium mass and information packing density to achieve a mechanically resonant system.

This invention relates to telephone repertory dialers and more particularly to repertory dialers employing magnetic recording media and multifrequency signaling.

Telephone repertory dialers continue to attract increasing numbers of telephone subscribers owing to a number of desirable features that include general convenience, high speed dialing and built-in directories. The market for such telephone station apparatus still remains far below its potential, however, as the result of the relatively high cost and complexity of the equipment as compared to conventional telephone sets. These limitations are especially evident in multifrequency dialing sets wherein magnetic recording of directory numbers is effected in terms of a binary pulse code which code is then translated into multifrequency signal bursts in a frequency code suitable for transmission. A dialer of this type is disclosed by D. D. Huizinga and T. B. Prince in a copending application Ser. No. 419,517, filed on Dec. 18, 1964, now U.S. Patent 3,364,314.

One of the specific problems not fully met in the prior art relates to the relatively low density of the recorded binary pulse information and the attendant requirement for a recording medium having an undesirably large physical size. The low density recording is in turn related to the readout technique wherein the recorded information is detected from the magnetic recording surface while the surface is scanned at a continuous rate. During the subsequent translation and transmission period, no information is read from the tape and, as a result, a significant amount of tape is not fully utilized. A side effect of this condition is that the scan speed used for readout must be relatively slow which in turn severely limits the magnitude of the output signal induced in the head.

Despite the overall convenience aspects of repertory dialers, their utility has not been fully exploited in terms of providing a very simple, fast and reliable access to a selected director number in the repertory. In some instances, particularly if the number to be dialed is known or otherwise readily available, the question arises as to whether any substantial benefit over conventional dialing is realized by utilizing a somewhat cumbersome selector arrangement to locate and extract the desired directory number from the repertory storage medium.

Accordingly, one broad object of the invention is to simplify repertory dialers of the multifrequency signaling type.

Another object is to reduce the physical size of the recording medium required for a directory of a particular capacity.

A further object is to reduce wear and mechanical shock and thereby increase reliability.

Still another object is to reduce the level of amplification required for output signals.

An additional object is to enhance the convenience of directory selector arrangements in telephone repertory dialers.

These and other objects are realized in accordance with the principles of the invention in one illustrative embodiment wherein the recording of a dialed digit is effected in terms of a simultaneous parallel recording of a simple pattern of reversed and nonreversed magnetic saturations, rather than by conventional pulses. More specifically, in accordance with the invention, a four channel binary code is employed based not on an unvarying pattern in the direction of magnetization for each particular digit but rather on a change or no-change in the polarity of magnetization in each channel as compared to the polarity of magnetization in that channel prior to the application of recording current. An exceptionally high density of recorded information is made possible thereby.

Another aspect of the invention relates to the means of achieving necessary relative movement between the recording medium and the magnetic transducer or head. This aspect of the invention is based in part on the realization that the phenomenon of mechanical resonance may be uniquely turned to account in a mechanism employed to move the recording medium in incremental steps in both the record and reproduce modes of operation. Specifically, the magnetic medium is disposed on the surface of a rotatable drum member. A motor drives a shaft that is coupled to a second shaft through a slip-clutch. The second shaft is in turn linked to the drum through a spring coupling. The drum is held in place through a system of latching levers while the motor driving through the clutch cocks the spring. A logic circuit controls the levers to release the drum for travel through an angle of rotation corresponding to a single recorded digit, the drum being driven by the spring coupling at a velocity approximately twice that of the motor shaft. The high velocity ensures increased voltage in the output signal and thus reduces the requirement for amplification. Moreover, the resonant characteristic of the system, as defined by the velocity, drum mass, spring constant and rotational angle of drum travel for each digital space, eliminates the mechanical bounce that would otherwise occur at the termination of each step when the drum is again latched.

An additional aspect of the invention concerns a unique selector system that properly positions the drum to a position indicative of a preselected recorded directory number in response to the manual opeartion of a single corresponding pushbutton and its associated switch.

Accordingly, one feature of the invention is a telephone repeortory dialer with a pushbutton type dial that records each digit in a parallel, multitrack digital code in the form of a unique combination of magnetizations and reverse magnetizations, the particular direction of magnetization employed in any one channel for a selected digit being dependent both upon the digital code of that digit and upon the direction of magnetization employed in the same channel for the previously recorded digit.

Another feature resides in a mechanically resonant drive system that moves the recording drum at high speed in both the record and reproduce modes through precise angles of rotation each corresponding to the angular space or to one half of the angular space occupied by the recording of a single digit.

An additional feature lies in a directory selector system requiring the operation of only a single pushbutton to select a desired recorded directory number for dialing out. The positioning of the recording drum during the selecting procedure is effected in part by the same mechanism employed for the incremental stepping.

The principles of the invention together with additional objects and features thereof will be fully apprehended from the following detailed description of an illustrative embodiment and from the appended drawing in which:

FIG. 1 is a sketch of the mechanically resonant magnetic storage drum driving system utilized in a repertory dialer in accordance with the invention;

FIGS. 2A, 2B and 2C taken together present a schematic circuit diagram of the control system of a repertory dialer in accordance with the invention;

Figure 7:
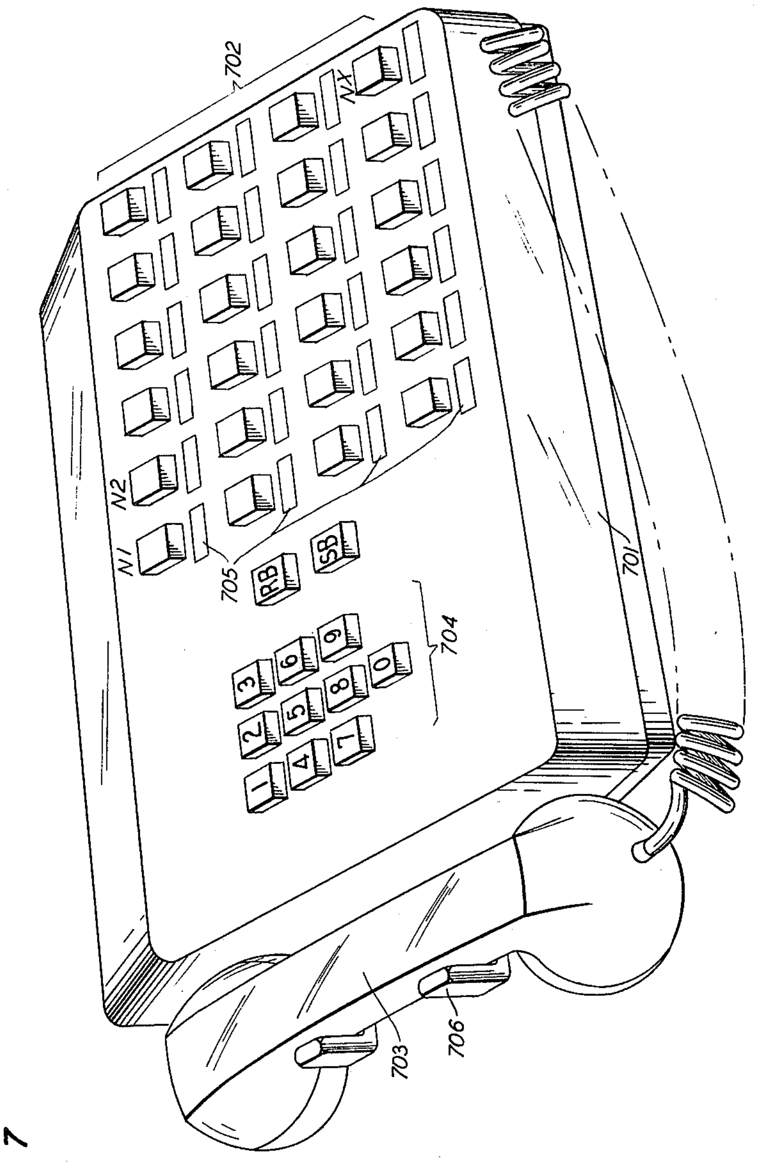
FIG. 7 is a sketch, shown in perspective, of a repertory dialer in accordance with the invention.

From FIG. 7 it may be seen that a repertory dialer embodying the features of the invention includes a housing member 701 that provides a mounting for a switch hook 706 which in turn supports a handset 703. Manually actuated control means include a conventional multifrequency or TOUCH-TONE dial 704 mounted in the left of the face of the housing 701 and an arary of selector buttons 702 numbered N1, N2 . . . NX, each providing access to a respective memory slot in the magnetic storage medium which may be a magnetic tape or a magnetic drum, for example. The windows 705 provide a means for visibly recording the identity of each of the selector buttons 702 in terms of a name or in terms of the corresponding stored directory number.

Figures 3, 4, 9:
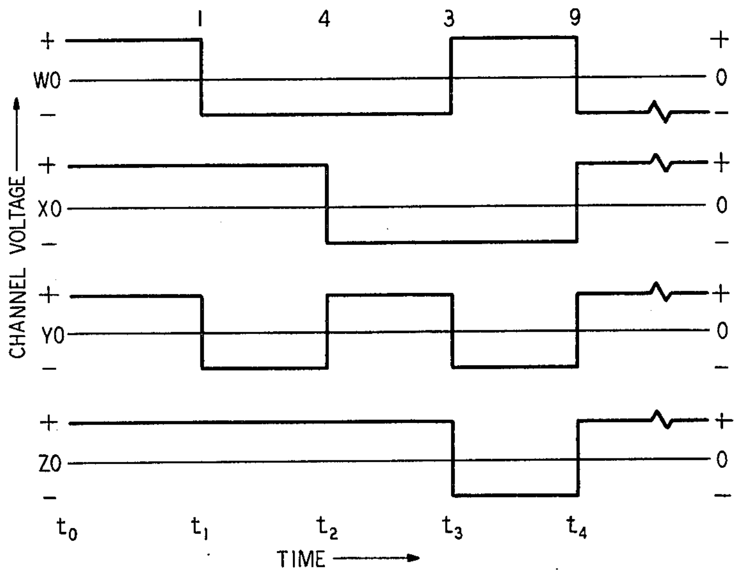
FIG. 3 is a sketch of a magnetic polarity reversal coding pattern utilized, in accordance with the invention, to record an illustrative directory number.
FIG. 4 is a table of an illustrative code providing for translation between multifrequency and digital code forms in accordance with the invention.
FIG. 9 is a block diagram of the relation among FIGS. 2A, 2B and 2C.
Figure 6A:
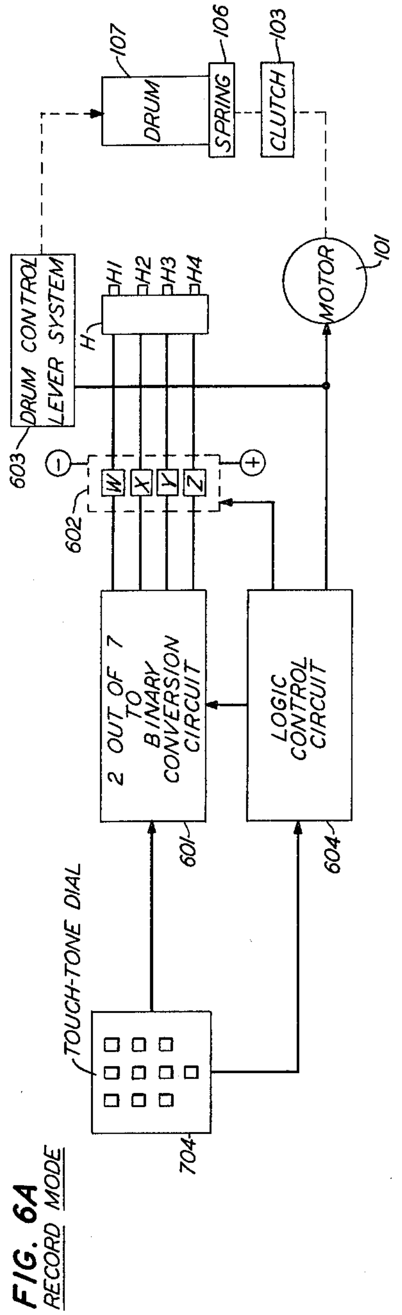
FIG. 6A is a functional block diagram of a dialer in accordance with the invention shown in the record mode.
Figure 6B:
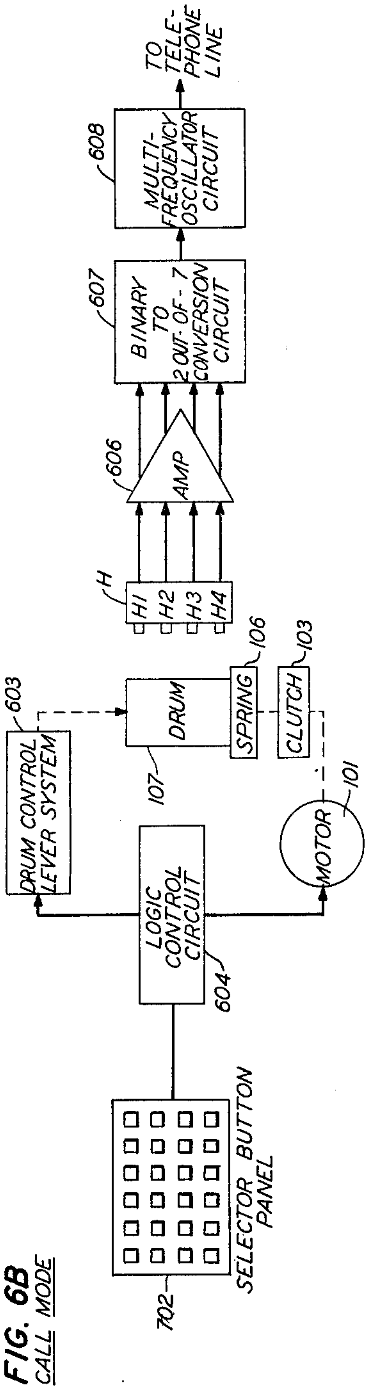
FIG. 6B is a functional block diagram of a dialer in accordance with the invention shown in the call mode.

The broad functional aspects of the recorder shown in FIG. 7 are best described in terms of the functional block diagrams of FIGS. 6A and 6B. In the record mode, output from the conventional TOUCH-TONE dial 704 is in the usual two-out-of-seven multifrequency code, as illustrated in FIG. 4, wherein a tone burst at one of three frequencies in a relatively low frequency band is combined with a simultaneous tone burst at one of four frequencies in a relatively high frequency band. The dial output is fed to a two-out-of-seven to binary conversion circuit 601 which in conjunction with a bank of relays 602, designed relays W, X, Y and Z, control the polarity of the current that is applied to each of the individual heads H1 through H4 of a head H in accordance with the digital code shown in FIG. 4.

The general sequence of operations that takes place during a recording cycle, including the operations required to step the magnetic drum 107 is under the control of a logic control circuit 604 and a drum control lever system 603. The actual driving of the drum 107 in incremental steps, two steps being taken for each recorded digit, is effected by a motor 101 driving through a slip-clutch 103 and a spring coupling 106.

In accordance with the invention, information in binary code form is applied to the drum 107 by the individual recording heads H1, H2, H3 and H4 not as pulses but rather, in each instance, in terms of the reversal or nonreversal of an established saturation current. By examining FIG. 3 in conjunction with FIG. 4, it may be seen that a digital "1" is represented by a change in polarity whereas a digital "0" is indicated by an absence of polarity change. This recording scheme is of course in contrast to the conventional pulse, no-pulse system that results in a substantially lower recording density. Thus, digits 1, 4, 3 and 9, for example, would be recorded in the manner indicated in FIG. 3.

From FIG. 3 it is also evident that, in accordance with the principles of the invention, the initial current is in the same direction for each of the four recording tracks or channels at the initiation of the recording sequence, and the state in which a track is left at the end of any impression of recorded information is maintained for the remainder of the space on the drum, thereby erasing from the corresponding memory slots any information which may have been present from previous recordings.

Figures 2A, 5:
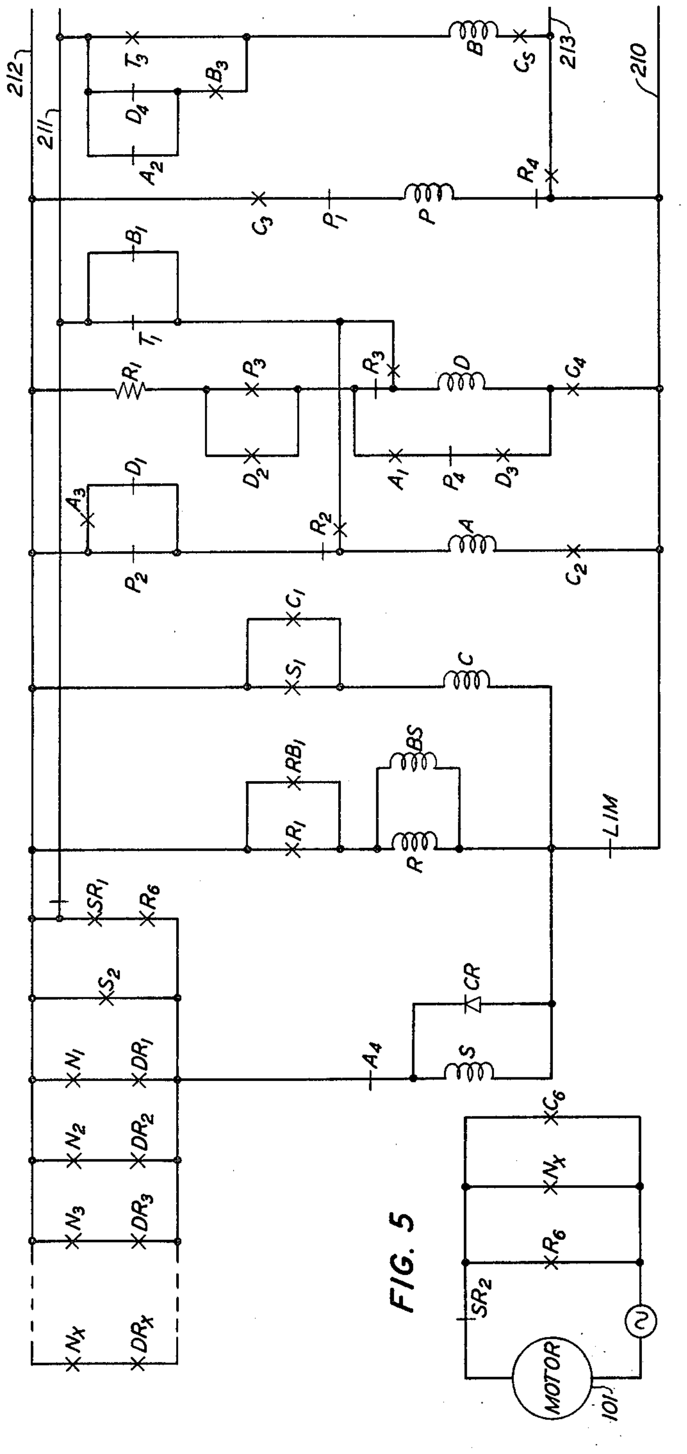
FIG. 5 is a schematic circuit diagram of the control circuit for the motor shown in FIG. 1.

Operation in the call mode which is illustrated by the functional block diagram of FIG. 6B, is initiated by depressing that single one of the selector pushbuttons of panel 702 that corresponds to the block of drum memory slots having a desired directory number stored therein. The drive motor 101, FIG. 5, is started as the motor circuit is completed by the operation of make contact $N_x$, corresponding to the depressed NX pushbutton. As explained above, the drum 107 is driven by the motor 101 through the clutch 103 and the spring coupling 103 under the control of the logic circuit 604 and the drum control lever system 603. The drum 107 is automatically brought to rest by the drum control lever system 603 when the magnetic recording of the first digit of the desired directory number is brought into correspondence with the head H. The drum 605 is then stepped successively through one digital space at a time, each digital step corresponding to an angular drum rotation of one degree, for example. The output signals induced thereby in the head H are amplified by the amplifier 606. Signals present in any of the four output channels of the amplifier 606 are in turn applied to the conversion circuit 607 thereby generating output signals to which the multifrequency oscillator circuit 608 is responsive. Multifrequency tone signals are applied to the telephone line in conventional fashion from the oscillator 608.

Figure 1:
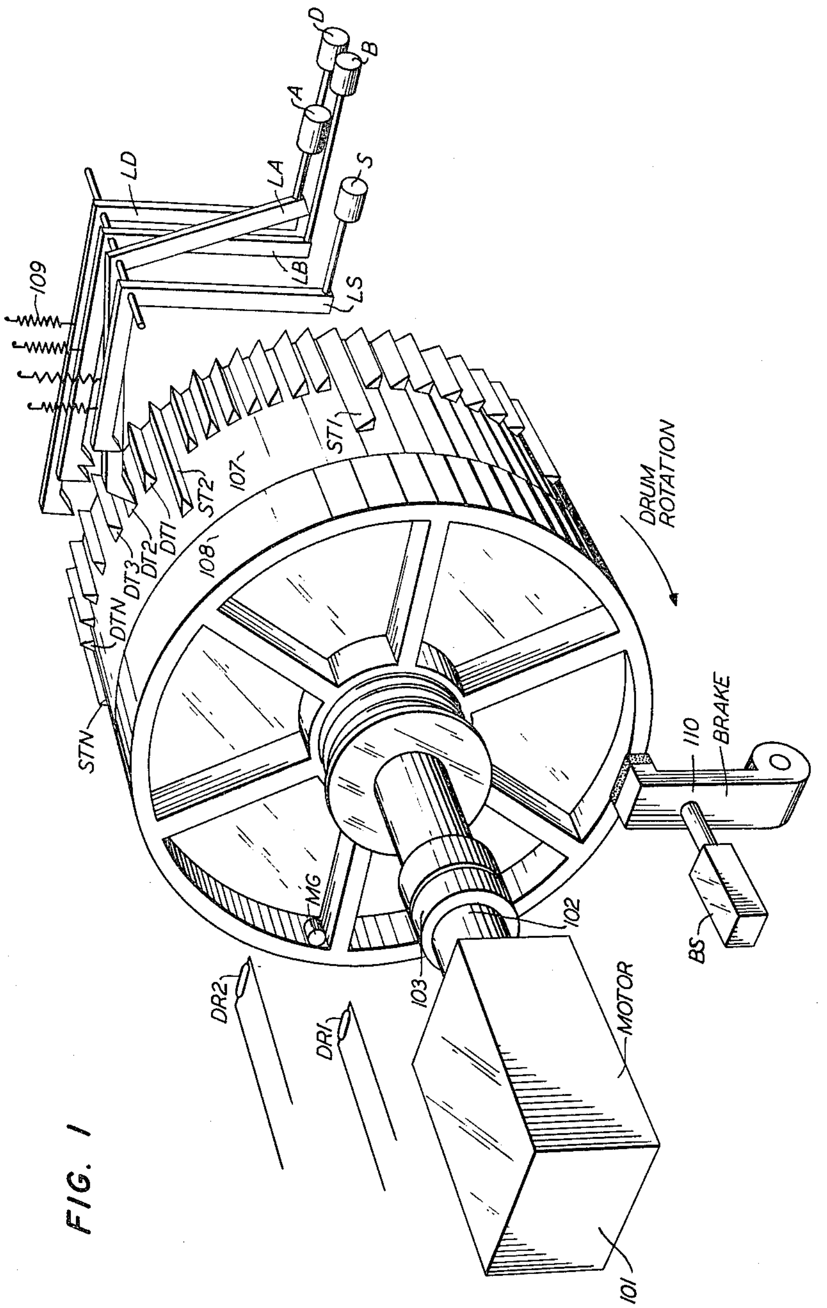

A fuller understanding of the principles involved in the control of the stepping movement of the drum 107 in both the record and call modes of operation may be gained from a consideration of FIG. 1. During a recording cycle, the motor 101 is operated continuously, being started in a manner described in detail hereinbelow, by the operation of the record button RB, shown in FIG. 7. Whether the drum 107 is in fact advanced as the motor 101 applies a rotational force through the slip-clutch 103 and the spring coupling 106, is determined by the position of the ratchet levers LA, LB, LD and LS, under the control of the corresponding solenoids A, B, D and S. Levers LA, LB, LD and LS are pivotally mounted and spring loaded by spring 109, as shown, and are provided with teeth for engaging relation with the ratchet teeth DT1 . . . DTN on the surface of the drum 107. As shown, the teeth on the surface of the drum 107 are divided into groups, each group having a number of teeth DT1 . . . DTN corresponding to one half the maximum number of digits in the directory numbers to be recorded or one tooth for each adjacent pair of digital spaces or memory slots.

During the stepping operations, only a single one of the levers LA, LB, LD or LS is utilized at any one time to hold the drum in position. Lever LS is utilized to hold the drum in a preselected initial position. During the record operation, the drum must be stepped in increments corresponding to one half of each digital space. Thus, if one degree is used as the magnitude of a digital space, the drum is stepped in one-half degree increments. More specifically, after the drum has been positioned by lever LS, the stepping action is accomplished by operating levers LA and LD together and alternating them with lever LB. As shown in FIG. 1, lever LB is provided with two teeth located one digital space apart and displaced one half of a digital space from the angular position of levers LA and LD. Levers LA and LD, on the other hand, are spaced one digital space from each other and are utilized to step the drum one full digital sapce at a time during the call function. The teeth on the drum, however, are located two digital spaces apart. Consequently, levers LA and LD may both be operated and the release of the lever holding the drum permits the drum to come to rest against the other lever. It is the employment of two digital spaces between adjacent drum teeth that requires lever LB to be provided with two teeth.

The combination of drum mass and spring constant, the latter being commonly termed the torsional modulus of elasticity, is a key factor that is utilized in accordance with the invention, to ensure mechanical resonance in the system. The conventional basic equation for expressing the primary relationships that exist in a resonant oscillating system is normally written in the form $$\lambda f = v \qquad (1)$$

where $\lambda$ is wavelength, where $f$ is the frequency of oscillation and where $v$ is the velocity of propagation of the wave. In rotational coordinates Equation 1 is expressed in the form $$\theta_{\lambda} f = w \qquad (2)$$

In the oscillatory mechanically resonant system that is utilized in accordance with the invention to rotate the recording drum in discrete angular steps, $\theta_{\lambda}$ is equivalent to the angular measure of the interdigital spaces, which is to say one half the angular distance between adjacent teeth such as DT1 and DT2, $\omega$ is equivalent to the rotational velocity of the driving shaft and $f$ is the resonant stepping frequency of the system. With an increase in the moment of inertia or mass of the drum 107, it is evident that the frequency $f$ is reduced. Further, with an increase in the spring constant of spring 106 it is evident that the frequency $f$ is increased. Moreover, from Equation 2 it is evident that if additional digits are to be located in a given recording space, the interdigital space $\lambda$ is reduced. To maintain balance in the equation either the resonant frequency must be increased or the drive speed reduced. Similar identities can obviously be made for both the frequency $f$ and the drive speed $\omega$.

When the drum 107 is held in a fixed position by one of the levers LA, LB, LD or LS and the rotation of shaft 102 applies a torsion through slip-clutch 103 and through the spring coupling 106 so that the drum 107 is held fast against the head or latching end of the restraining lever, the lever which is located one step ahead is thereby enabled. Releasing the drum restraining lever in accordance with the programmed logic of the system, permits the drum 107 to advance one step. When drum release occurs, spring tension from the spring 106 applies a torque to the drum which is accelerated to an angular velocity equal to twice the angular velocity of the shaft 102, as illustrated by the plot of a drum-velocity curve shown in FIG. 8.

Figure 8:
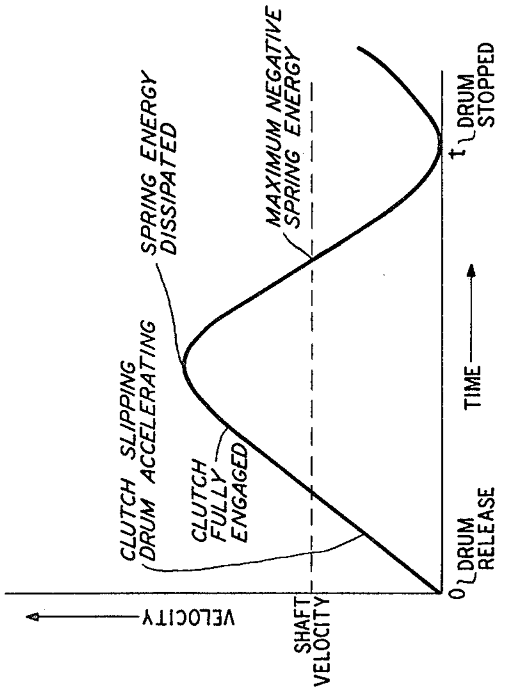
FIG. 8 is a plot of the drum velocity vs. time relation in a dialer in accordance with the invention.

After the drum 107 attains peak velocity, it is decelerated as the spring 106 is in effect wound up in th› opposite direction and the drum velocity is reduced in magnitude to correspond to the velocity of the shaft 102, although at this point the drum 107 and the shaft 102 are rotating in opposite directions. This new velocity of the drum, as shown in FIG. 8, is with respect to the shaft 102. Stated otherwise, the periphery of the drum 107, shortly after its release, has a linear velocity past a fixed point in space equal in magnitude to the velocity of twice that which would be obtained if the drum were attached directly to the driving shaft rather than through the slip-clutch and spring coupling arrangement of the invention. The drum 107 is then slowed down until it is at rest with respect to the fixed point in space. Accordingly, the tape 108 or other recording medium on the drum 107 is driven past the recording head H so that in the call or readout mode the resonant effect alone of the drum driving system produces a 6 db gain in output and, additionally, owing to the resonant nature of the system, the drum is stopped without bounce after rotating through a single increment or step inasmuch as the oscillatory energy in the direction of rotation has been substantially dissipated at the end of the step. The rotation of shaft 102 restores the biasing force in spring 106 and the slip-clutch 103 functions until the drum 107 is permitted to move to the next position.

In addition to the 6 db signal improvement which results from the resonance of the driving system, gain also results from the relatively high speed of rotation of the shaft 102 which may be employed when driving the drum in incremental steps as contrasted with the relatively slow speed of rotation that would be required in the event that a continuous scanning approach were employed. Thus, for the same density of information on the recording medium a continuous scanning approach employing an average conventional velocity would read a word length of 14 digits in approximately 1.5 seconds and typical of relative tape speed past the head would be one-quarter inch per second. With the stepped drum, the relative tape speed past the head can be designed for a substantially increased range of speeds. Thus, a typical design in accordance with the invention could increase the shaft speed to 36 times the continuous scan approach. Such an increase in speed would provide an output voltage from the head which would be 31 db larger. The resonance effect would add another 6 db to the signal. Consequently, a typical system in accordance with the invention may provide 37 db in gain over conventional continuous scanning systems.

DETAILS OF OPERATION IN THE RECORD MODE

A complete analysis of the sequence of operations that occurs in the record mode may best be presented primarily in terms of the schematic circuit diagram shown in FIGS. 2A, 2B, 2C and FIG. 5. Prior to the commencement of an actual recording cycle, it is of course essential to bring the desired recording slot on the drum in correspondence with the head. Details of the manner in which that step is accomplished are described hereinbelow under the heading "Details of the Call Mode of Operation." Assuming that the drum and head are aligned, operation in the record mode is initiated by pressing record button RB, FIG. 7, closing make contact $RB_1$, FIG. 2A, to complete an obvious energizing path for relay R to the relay supply voltage source 275, FIG. 2B. Relay R is locked up over a holding path that includes make contact $R_1$. The motor 101 is started by the closure of make contacts $R_6$, FIG. 5. Current for the operation of relays B and T is applied from the relay supply voltage source 275 by way of make contact $R_4$. Relays A and D are transferred to a ready-to-operate or record state by the operation of make contacts $R_2$ and $R_3$ respectively.

Figure 2B:
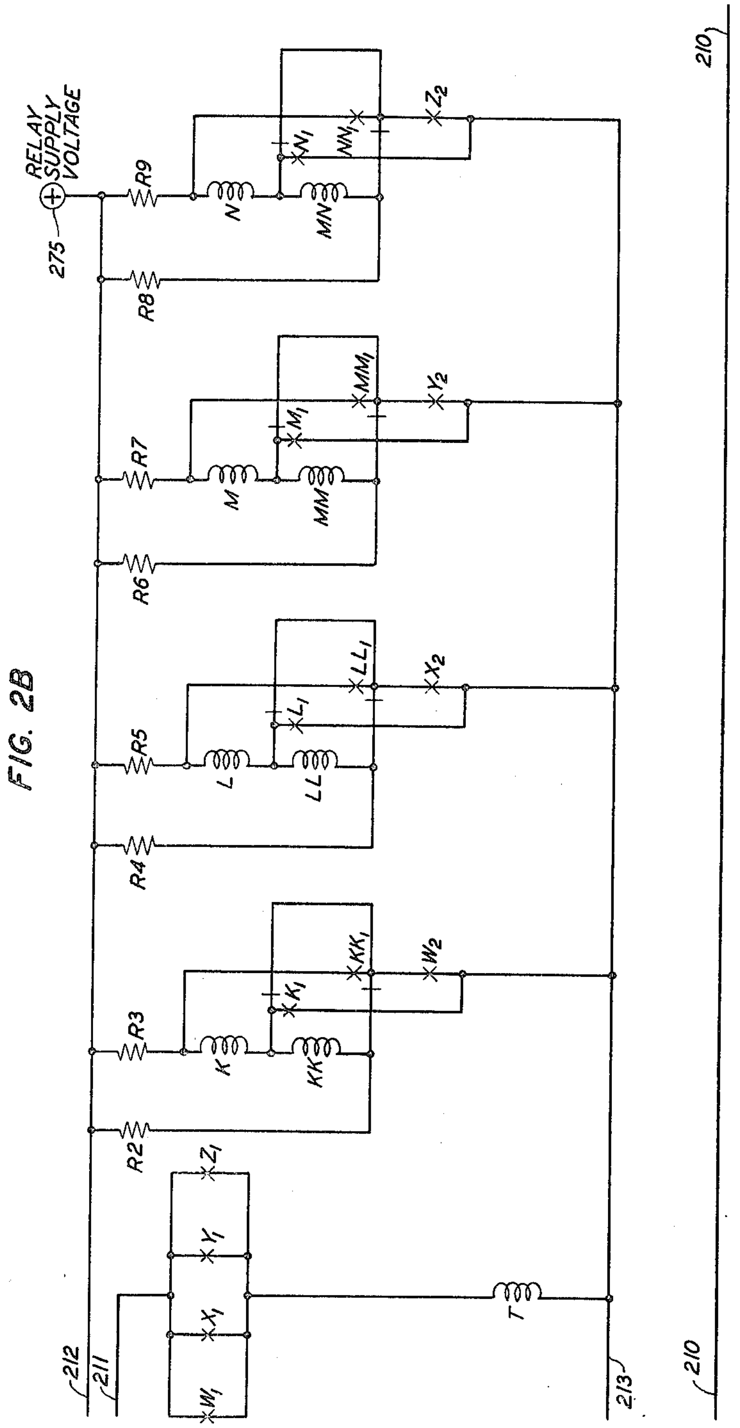
Figure 2C:
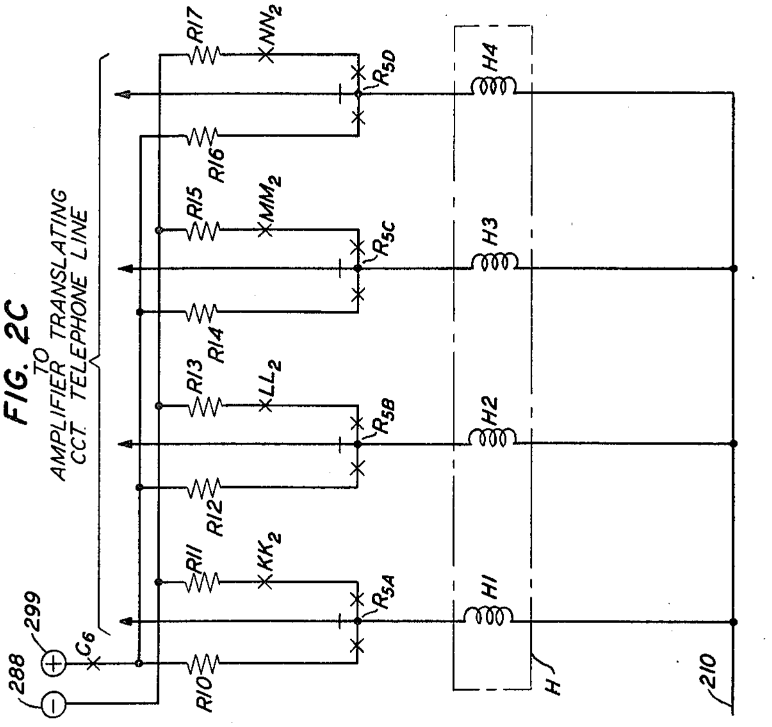

The operation of break contacts $R_{5A}$ through $R_{5D}$, FIG. 2C, removes the channel amplifier 606, FIG. 6B, from the magnetic head H and at the same time current supply sources 288 and 299, FIG. 2C, are enabled by the operation of make contacts $R_{5A}$ through $R_{5D}$. Also at this time, brake solenoids BS, FIG. 2A, is energized by way of make contact $R_1$ to operate a sliding friction brake 110, FIG. 1, which absorbs a portion of the spring energy during the record interval but does not stop the motion of the drum.

The drum 107 is held in position by the stop lever LS bearing against one of the stop teeth such as ST2, for example, shown in FIG. 1. (Lever LS and solenoid S are actually shown in the unoperated position in FIG. 1.) The solenoid S, shown in FIG. 1 and in FIG. 2A, is in fact operated at this point in the call mode sequence over a path that includes one of the selector panel switches $N_1, N_2 \ldots N_X$ and a corresponding one of the dry reed switch contacts, $DR_1$, $DR_2$ . . . $DR_X$ which is in turn operated by the magnet MG which is mounted on the drum 107, as shown in FIG. 1, and marks the radial position that corresponds to the position of the first digit of each respective recorded directory number.

Relay C is energized over make contact $S_1$ and locks up over its own make contact $C_1$. Relay C enables relays A, D and B by way of make contacts $C_2$, $C_4$ and $C_5$, respectively. Positive current is made available to each of the individual heads H1 through H4 from source 299 by way of make contact $C_6$ and the left make contacts $R_{5A}$ through $R_{5D}$. When relay A operates, solenoid S is released as its operating path is opened by break contact $A_4$. With solenoid S released, stop lever LS, FIG. 1, is raised from the drum 107 and at this point the drum 107 is held in position by lever LA bearing against a drum tooth such as DT2 for example. Upon completion of the foregoing sequence of operations, the drum 107 is ready to receive information for storage.

The operation of any digit indicating pushbutton of the TOUCH-TONE dial 704 results in the activation of relay T, FIG. 2B, over a path that includes one or more of the make contacts $W_1$, $X_1$, $Y_1$ or $Z_1$, as one or more of the relays W, X, Y and Z, FIG. 6A, is operated in accordance with the code shown in FIG. 4. The operation of one or more out of four relays in accordance with a digital code in response to the actuation of a single digit indicating dial pushbutton is well known in the art, being disclosed for example by D. D. Huizinga and T. B. Prince in a copending application, Ser. No. 419,517 filed Dec. 18, 1964.

Make contact $T_3$ completes a path for the operation of relay B while the operation of break contact $T_1$ releases relays A and D when relay B has operated. The break contact $B_1$ ensures that relays A and D will not release until solenoid B has operated. It should be noted at this point that the designations A, B, D and S are employed to indicate the lever operating solenoids shown in FIG. 1 as well as the corresponding contact operating relays shown in FIG. 2A. In each instance, the electromagnetic structure is common but alternatively, the corresponding relays and solenoids may be electromagnetically separate. One of the levers LA, LD or LC is always present to stop the drum 107 at the proper location during the stepping process. Without such a feature, a sticky or otherwise temporarily malfunctioning relay or solenoid could result in skipping one of the tooth stops on the drum and the recorded information woul then be without value.

Relay B, energized as described above, is held operated over a path that includes make contact $C_5$ and make contact $T_3$. The operation of a pushbutton on the TOUCH-TONE dial 704, such as pushbutton "one" for example, results in the operation of channel relays W and Y in accordance with the code shown in FIG. 4 where a "1" indicates a change in polarity and a "0" indicates no change. The operation of make contact $W_2$ completes a path for the operation of relay K and the resulting operation of make contact $K_1$ completes a path for the operation of relay KK. Negative current, which represents a polarity reversal, is thus applied to head H1 from source 288 by way of resistor R11, make contact $KK_2$ and the right make contact $R_{5A}$.

In similar fashion, a polarity reversal is applied to head H3 by way of resistor R15, make contact $MM_2$, and the right make contact $R_{5C}$. The resulting signal pattern is shown in FIG. 3 which also illustrates signal patterns for the digits "4," "3" and "9." Relays L, LL, N and NN and their associated contacts perform in the same fashion as relays K and KK, being utilized whenever the encoding of a particular digit calls for the operation of the X or Z relays. This circuit, although uniquely adapted for use in accordance with the invention in the manner indicated, is substantially conventional, being commonly known as a "count-by-two circuit" in certain dial register circuits found in telephone control offices.

The operation of solenoid B and the subsequent release of solenoids A and B permits the drum 107 to rotate through one half of a digital space, one-half degree for example. At this point solenoid B and its corresponding control lever LB holds the drum 107.

All of the steps described in the three immediately preceding paragraphs take place when the operator depresses the dial pushbutton corresponding to the first digit. The release of this pushbutton by the operator reactivates relays A and B by closing break contact $T_1$. When relays A and D operate, relay B is released and the drum rotates through the remainder or second half of the first digital space. The subsequent operation of other digit indicating pushbuttons of the dial 704 results in a substantial repetition of the steps described.

After completion of the recording of the desired digits, the operator may push the stop-record button SR, FIG. 7. Relay S is energized via make contacts $SR_1$ and $R_6$ and locks up over make contact $S_2$. Depression of the stop-record button SR also releases relays A, D and B through the operation of break contact $SR_1$ and both of the control levers LA and LD are released. Relay T is also released. The rotation of the drum 107 while maintaining the head current in each of the heads H1 through H4 in the same state that was present upon the termination of the recording of the final digit, erases all previously recorded information between the end of the newly recorded digits and the end of that particular block of memory slots. Operation of a simple mechanically operated limit switch, shown as break contact LIM in FIG. 2A, restores the circuit to its initial state.

DETAILS OF THE CALL MODE OF OPERATION

The desired directory number recorded on the magnetic surface 108 of drum 107 is brought into correspondence with head H through the operation of one of the selector buttons N1 through NX and its corresponding contacts $N_1$ through $N_X$ together with the operation of a corresponding one of the reed switches $DR_1$ through $DR_X$. The circuit for the operation of the motor 101 is completed by the closure of any one of the make contacts $N_1$ through $N_X$. With solenoid S operating over a path completed by the contacts indicated, relay C is energized over a path that includes make contact $S_1$ and is locked up over its own make contact $C_1$. Contact $C_6$ maintains power to the motor during the record and the readout sequences previously described. Relay C also enables relays A and P which lock up over paths completed by make contacts $C_2$ and $C_3$ respectively. At this point the drum 107 is held in position by the lever LA. Solenoid S is shunted by a diode CR to ensure that release does not occur until relay A is energized. Relay P and its break contact $P_1$ provide a self-stepping action that controls the rate of readout of the recorded directory number. When relay P operates, relay D is energized over a path that includes resistor R1 and make contact $P_3$. Break contact $P_2$ opens so that relay A is held operated over a path that includes make contact $A_3$ and break contact $D_1$. Break contact $D_1$ ensures that relay A does not release relay D is energized.

When relay D is energized by way of make contact $B_3$, the release of relay A permits the drum to rotate one digital space during which readout occurs. The release of relay P energizes relay A by way of break contact $P_2$, and the combination of make contact $A_1$, break contact $P_4$ and make contact $D_3$ shorts out relay D. With the release of make contacts $D_2$ and $D_3$, relay D is disabled. The release of solenoid D and its corresponding lever LD permits the drum to rotate to a second digital space. The operation continues until the scanning of the selected block of memory slots has been completed.

Repeated operation of relay P continues in the sequence as outlined above until a mechanical stop, not shown, associated with the succeeding directory number space on the drum operates limit switch LS and the circuit is once again returned to its initial state.

It is to be understood that the embodiment described herein is merely illustrative of the principles of the invention. Various modifications may be effected by persons skilled in the art without departing from the spirit and scope of the invention.

What is claimed is:

1. A telephone repertory dialer comprising, in combination, a rotatable member having at least a portion of its surface magnetizable, means for applying a force tending to rotate said member, means for locking said member in position irrespective of the application of said force, spring means in driving relation to said member tensioned by said force, means for generating signals in simultaneous parallel relation indicative of a dialed digit, means including a record-reproduce head responsive to said signals indicative of a single dialed digit for simultaneously magnetizing a portion of said surface in accordance with a coded pattern corresponding to said last named digit, manually operative means for momentarily releasing said locking means, whereupon said member is rotated by said force applying means and by said spring means through an arc corresponding to the space occupied by said coded pattern, thereby inducing signals in said head for translation and transmission, said force applying means including a motor having a shaft, a slip-clutch positioned between said shaft and said rotatable member and said spring means being positioned around said shaft between said slip-clutch and said rotatable member, a mechanically resonant system being defined in terms of the packing density of said coded patterns, the rotational speed of said shaft, the mass of said rotatable member and the spring constant of said spring.

2. A telephone repertory dialer comprising, in combination, a magnetic recording medium, a dial assembly including a plurality of pushbuttons each corresponding to a dialed digit, means including a record-reproduce head for simultaneously applying a magnetizing current of a common polarity to each of a plurality of discrete areas on said medium, means responsive to the operation of one of said pushbuttons for applying a magnetizing current opposite in polarity to said common polarity simultaneously to one or more of said discrete areas in accordance with a digital code thereby to form a parallel group of said areas indicative of a dialed digit in terms of said code, means including said head for simultaneously sensing each parallel grouping of said areas indicative of a dialed digit, means for effecting a relative stepping movement between said medium and said head whereby the identity of a recorded digit is sensed at each step, means responsive to said sensing means for generating a multifrequency signal burst corresponding to each of said parallel area group, each of said last named signals being indicative of a recorded digit in terms of a frequency code, said means for effecting a relative stepping movement including a drum member supporting said magnetic medium, means for latching said drum in a fixed position, logic circuitry for controlling said latching means, spring means for driving said drum through each of said stepping movements, and means for cocking said spring means after each of said stepping movements, the mass of said drum, the packing density of said groups of areas, the rotational velocity of said drum through each of said stepping movements and the spring constant of said spring defining a mechanically resonant system, thereby substantially eliminating the mechanical shock and wear that would otherwise be an incident to each of said stepping movements.

References Cited

UNITED STATES PATENTS

| | | | |
|---|---|---|---|
| 2,061,273 | 11/1936 | Green | 179—90 |
| 3,234,336 | 2/1966 | Wells | 179—90 |
| 3,243,517 | 3/1966 | Miller et al. | 179—90 |
| 3,280,269 | 10/1966 | Brown et al. | 179—90 |
| 3,387,098 | 6/1968 | Fischer et al. | 179—90 |

KATHLEEN H. CLAFFY, Primary Examiner

A. B. KIMBALL, Jr., Assistant Examiner